(12) United States Patent
Boday et al.

(10) Patent No.: US 8,797,059 B2
(45) Date of Patent: Aug. 5, 2014

(54) IMPLEMENTING CARBON NANOTUBE BASED SENSORS FOR CRYPTOGRAPHIC APPLICATIONS

(75) Inventors: Dylan J. Boday, Tucson, AZ (US); Joseph Kuczynski, Rochester, MN (US); Jason T. Wertz, Wappingers Falls, NY (US); Jing Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 13/409,874

(22) Filed: Mar. 1, 2012

(65) Prior Publication Data

US 2013/0232587 A1    Sep. 5, 2013

(51) Int. Cl.
  *G06F 21/02*    (2006.01)
  *B82Y 30/00*    (2011.01)

(52) U.S. Cl.
  USPC ............... 326/8; 726/34; 713/194; 977/742; 977/932

(58) Field of Classification Search
  USPC ........... 326/8; 726/34, 35; 713/189, 192, 193, 713/194; 977/742, 932
  See application file for complete search history.

(56) References Cited

U.S. PATENT DOCUMENTS

| | | |
|---|---|---|
| 4,860,351 A | 8/1989 | Weingart |
| 5,117,457 A | 5/1992 | Comerford et al. |
| 5,406,627 A | 4/1995 | Thompson et al. |
| 5,532,293 A | 7/1996 | Landis |
| 5,858,500 A | 1/1999 | MacPherson |
| 6,848,320 B2 | 2/2005 | Miyajima et al. |
| 6,853,093 B2 | 2/2005 | Cohen et al. |
| 7,005,733 B2 | 2/2006 | Kommerling et al. |
| 7,409,876 B2 | 8/2008 | Ganapathi et al. |
| 7,522,040 B2 | 4/2009 | Passmore et al. |
| 7,538,400 B2 | 5/2009 | Segal et al. |
| 7,553,681 B2 | 6/2009 | Raravikar et al. |
| 7,673,521 B2 | 3/2010 | Ajayan et al. |
| 7,786,736 B2 | 8/2010 | Thostenson et al. |
| 7,948,041 B2 | 5/2011 | Bryant et al. |
| 8,013,988 B2 | 9/2011 | Xiao et al. |
| 8,020,456 B2 | 9/2011 | Liu et al. |
| 8,352,752 B2 | 1/2013 | Croguennec et al. |
| 2003/0124451 A1 | 7/2003 | Camillus et al. |
| 2008/0222427 A1 | 9/2008 | Baentsch et al. |
| 2009/0155571 A1 | 6/2009 | Mustonen |
| 2009/0292828 A1 | 11/2009 | Ebbers et al. |
| 2011/0051775 A1* | 3/2011 | Ivanov et al. .................. 374/143 |
| 2011/0200765 A1* | 8/2011 | Uyttendaele et al. ........... 428/29 |
| 2012/0298925 A1 | 11/2012 | Kim et al. |
| 2013/0010846 A1 | 1/2013 | Austermann et al. |
| 2013/0179996 A1* | 7/2013 | Boday et al. ..................... 726/34 |
| 2013/0213707 A1* | 8/2013 | Boday et al. .................. 174/546 |

* cited by examiner

*Primary Examiner* — Daniel D Chang
(74) *Attorney, Agent, or Firm* — Joan Pennington

(57) ABSTRACT

A method and circuit for implementing security protection with carbon nanotube based sensors for cryptographic applications, and a design structure on which the subject circuit resides are provided. A carbon nanotube layer is incorporated with a polymeric encapsulation layer of a security card. Electrical connections to the carbon nanotube layer are provided for electrical monitoring of electrical resistance of the carbon nanotube layer.

20 Claims, 6 Drawing Sheets

IMPLEMENTING CARBON NANOTUBE BASED SENSORS FOR CRYPTOGRAPHIC APPLICATIONS

FIELD OF THE INVENTION

The present invention relates generally to the data processing field, and more particularly, relates to a method and circuit for implementing security protection with carbon nanotube based sensors for cryptographic applications, and a design structure on which the subject circuit resides.

DESCRIPTION OF THE RELATED ART

Current security devices, such as IBM's X-crypto, are implemented to protect against data theft in both high end and personal computing systems. These devices utilize special high priced security features that drive up production cost and present many processing challenges during manufacturing. Current X-Crypto devices use expensive circuitry mats and a long processing time is required for limited quantity. Current X-Crypto circuitry mats are also susceptible to destruction during handling.

It is important though to recognize that each device must meet the U.S. Government Federal Information Processing Standards (FIPS), which are used as means to determine the protection offered from proposed and currently used security devices. For example, some security devices must meet high level requirements for security protection contained in the U.S. Government Federal Information Processing Standard (FIPS) 140-2 Security Requirements for Cryptographic Modules—(Level 4). The standard states that: "At this security level, the physical security mechanisms provide a complete envelope of protection around the cryptographic module with the intent of detecting and responding to all unauthorized attempts at physical access" (FIPS Pub 140-2).

A need exists for a circuit having efficient and effective sensors for security protection for cryptographic applications.

SUMMARY OF THE INVENTION

Principal aspects of the present invention are to provide a method and circuit for implementing security protection with carbon nanotube based sensors for cryptographic applications, and a design structure on which the subject circuit resides. Other important aspects of the present invention are to provide such method, circuit and design structure substantially without negative effects and that overcome many of the disadvantages of prior art arrangements.

In brief, a method and circuit for implementing security protection with carbon nanotube based sensors for cryptographic applications, and a design structure on which the subject circuit resides are provided. A carbon nanotube layer is incorporated with a polymeric encapsulation layer of a security card. Electrical connections to the carbon nanotube layer are provided for electrical monitoring of the electrical resistance of the carbon nanotube layer.

In accordance with features of the invention, the carbon nanotube layer is formed through the deposition of carbon nanotubes in high concentration to create a film structure defining the carbon nanotube layer. The carbon nanotube layer has a known resistance in the unstrained state. When strained from compression or tension the resistance of the carbon nanotube layer changes. Temperature change can be used to cause the polymer encapsulation layer to flow, which also results in a resistance change of the carbon nanotube layer. A predefined resistance change is identified to shutdown and, or erase the security card, or to continue operation of the security card.

In accordance with features of the invention, the polymeric encapsulation layer can be implemented with any polymer.

In accordance with features of the invention, the carbon nanotube layer can be used as functional fillers to strengthen the polymeric encapsulation layer. Other additives can be added to this layer such as fillers with flame retardant properties.

In accordance with features of the invention, carbon nanotube sensors measure resistance change based upon compression, tension, electrical shorts, and temperature changes, providing enhanced tamper detection.

In accordance with features of the invention, carbon nanotubes are cast to form the carbon nanotube layer, and encapsulated into the polymeric encapsulation layer without shorting out the security card. Electrical contacts optionally are made by inserting wires into the carbon nanotube layer.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and circuit for implementing sensors for security protection for cryptographic applications, and a design structure on which the subject circuit resides are provided. The circuit includes a carbon nanotube layer provided within an encapsulation layer used to encapsulate a security card and electrical connections for monitoring of the resistance of the nanotube layer.

Example Preparation of Carbon Nanotube Based Sensor

Figure 1:
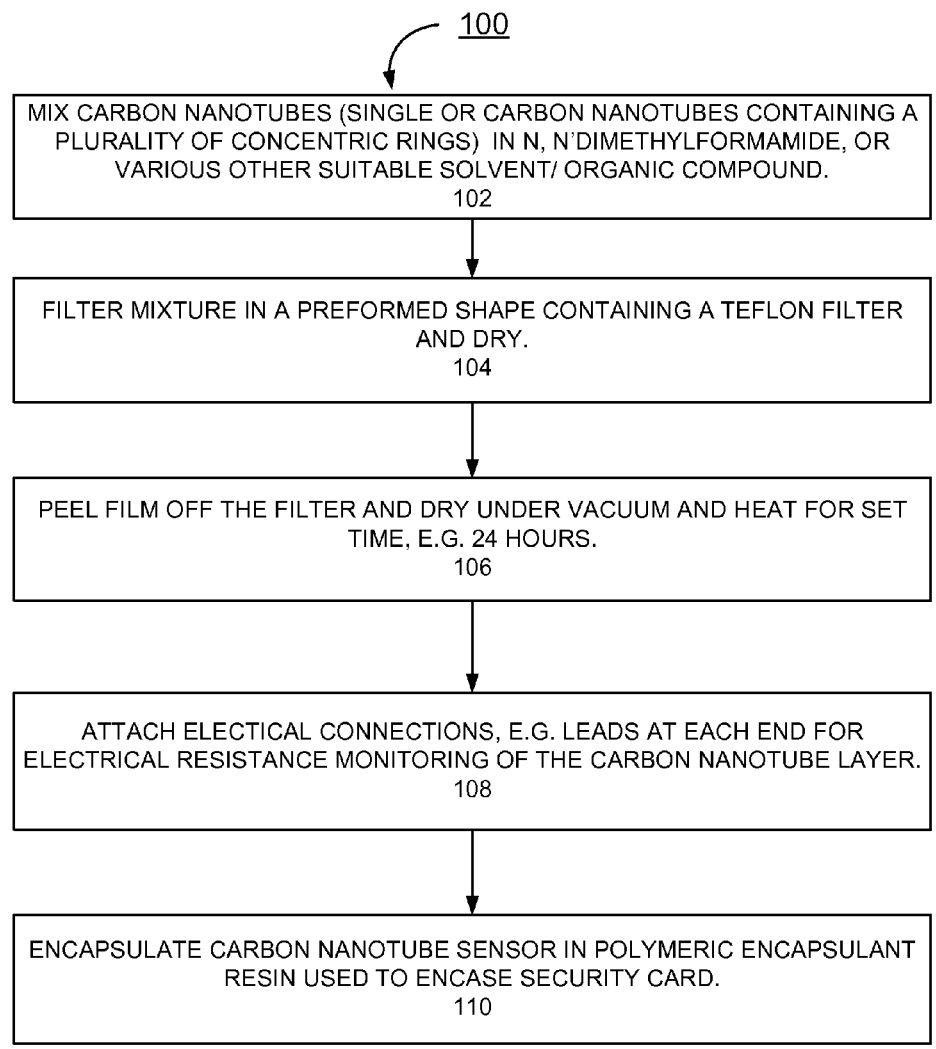
FIG. 1 is a flow chart illustrating exemplary steps for manufacturing a carbon nanotube based sensor for use for security protection for cryptographic applications in accordance with the preferred embodiment.

Having reference now to the drawings, in FIG. 1, there is shown a flow chart illustrating example steps generally designated by reference character 100 manufacturing a carbon nanotube based sensor for circuits used for security protection for cryptographic applications in accordance with the preferred embodiment.

As indicated at a block 102, carbon nanotubes (single or carbon nanotubes containing a plurality of concentric rings) are mixed in an organic compound, such as, N,N'-dimethylformamide, with the formula $(CH_3)_2NC(O)H$, or other solvent/organic compounds known to those in the art which disperse carbon nanotubes in organic media. As indicated at a block 104, the mixture is then filtered, for example, in a preformed shape containing a Teflon filter and dried. After drying, the film is then peeled off the filter and further dried under vacuum and heat for a set time, such as 24 hours, as indicated at a block 106. This is just a single example of carbon nanotube film formation, other processes to those known in the art to form carbon nanotube films may be used, such as solvent casts carbon nanotube films.

Electrical connections or leads are then attached to each end of the carbon nanotube layer to be used for electrical resistance measurements as indicated at a block 108. The newly formed carbon nanotube sensor is placed into a polymeric resin used to encase a security card, such as a security daughter card as indicated at a block 110.

In accordance with features of the invention, the use of carbon nanotubes allows electrical resistance to be measured for tamper detection. Carbon nanotubes can easily be cast into films and encapsulated into the polymeric encapsulation layer for a security card. The carbon nanotube layer can be used to strengthen the polymeric encapsulation layer.

In accordance with features of the invention, the carbon nanotube sensors measure resistance change based on compression, tension, shorts, and temperature changes. Monitoring resistance changes due to temperature prevents someone from using liquid nitrogen or heat to delaminate the polymeric encapsulation layer. Carbon nanotube resistance can be measured at a macro scale thus making the carbon nanotube sensors more sensitive than other strain gauges. Carbon nanotube sensors advantageously are used with various algorithms or security protection functions designed to shutdown power and, or erase contents of security card based on predefined electrical resistance changes. When a security card is encapsulated into polymeric resin containing a carbon nanotube respondent layer, the card becomes, for example, Level 4 FIPS secured. When the encapsulated card is placed into a metal security can, Level 3 FIPS is also achievable. Carbon nanotube sensors of the invention preferably are used for security protection circuitry, while other conductive materials having a measurable resistance could be used, such as carbon fibers, carbon black, a conducting polymer and conducting polymer fibers.

It should be understood that other embodiments of carbon nanotube sensors are provided in accordance with features of the invention. For example, in another embodiment of this invention the conductive carbon nanotube material optionally is blended into the polymeric resin with varying density encompassing low density encapsulates such as foams to high density encapsulates such as neat resin, for example, to form a resistive coating. Electrical contacts are made by inserting wires into this layer. Another embodiment of this invention includes the incorporation of the conductive carbon nanotube material into a foam that when compressed or expanded the foam's resistance changes thus resulting in a detected breach. The carbon nanotubes may be functionalized via covalent modification or non-covalent modification through the use of surfactants to aid in dispersing the carbon nanotube in resins used to encapsulate the card being secured.

In accordance with features of the invention, the carbon nanotube layer has a known resistance that is determined in the unstrained state prior to installation and a resistance change of the carbon nanotube layer is used to provide security protection. The amount of carbon nanotubes needed to form the carbon nanotube layer for a particular application easily can be determined by one skilled in the art. The carbon nanotube layer also acts as a functional filler to strengthen the polymeric encapsulation layer.

Figure 2:
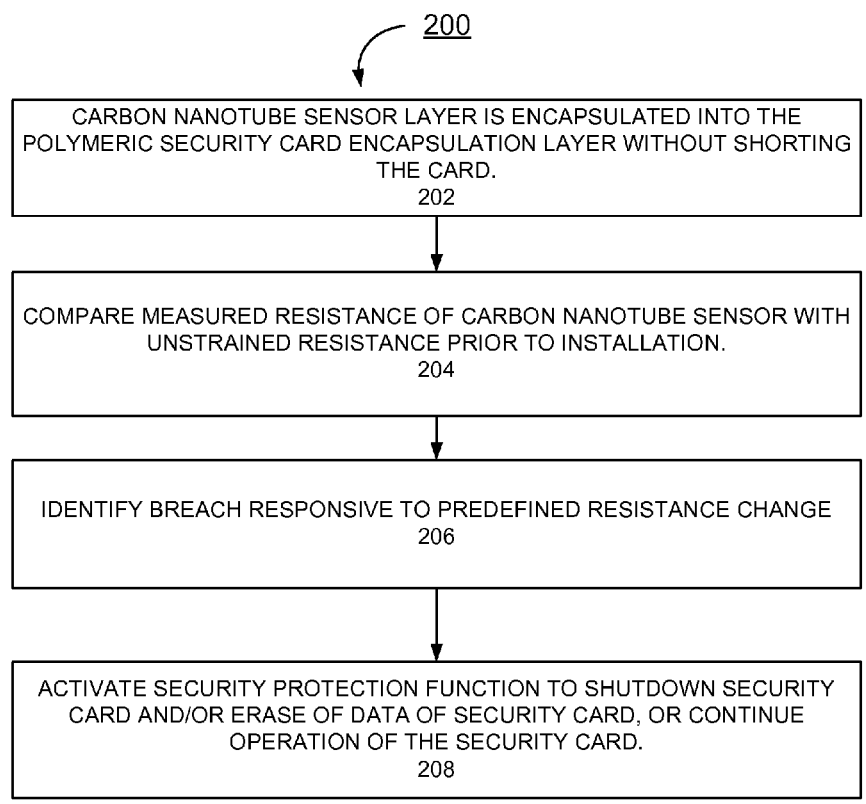
FIG. 2 is a flow chart illustrating exemplary steps for implementing a method and circuit for security protection for cryptographic applications using the carbon nanotube based sensor of FIG. 1 in accordance with the preferred embodiment.

Referring to FIG. 2, there are shown example steps for implementing a method and circuit for security protection for cryptographic applications using the carbon nanotube based sensor in accordance with a preferred embodiment generally designated by the reference character 200. As indicated at an initial step 202, a carbon nanotube layer is encapsulated into the polymeric security card encapsulation layer without shorting out the security card. The carbon nanotube layer can be formed, for example, using the example process of FIG. 1, and various techniques from generally inexpensive film formation to various more expensive templating techniques.

As indicated at a block 204, a measured resistance of the carbon nanotube sensor is compared with an unstrained resistance of the sensor.

In accordance with features of the invention, the carbon nanotube layer has a known resistance that is determined in the unstrained state prior to installation. In an embodiment of the invention, a baseline resistance for the carbon nanotube layer in the unstrained state is determined the first time the security card is powered up. When strained through compression or tension, the electrical resistance changes. This electrical change is monitored through a security protection function or algorithm that determines when a breach is occurring and erases and/or shuts down the security card, such as, a security daughter card and/or an associated primary card.

In accordance with features of the invention, the resistance change of the carbon nanotube layer also monitors temperature based upon the change in electrical conductivity of the carbon nanotube layer. When compressed, pulled, gouged, scraped, frozen, or heated the security protection function or algorithm processes the resulting change in electrical resistance of the carbon nanotube layer and determine whether to erase all data and/or shut down power to one or both boards.

As indicated at a block 206, a breach is identified by a predefined resistance change of the carbon nanotube sensor. As indicated at a block 208, responsive to the identified breach, the security card is shut down which optionally includes erasing all data. This then renders the card unusable.

It should be understood that various techniques and processes can be used to prepare the carbon nanotube based sensors of the invention, and various security protection functions or algorithms can be used in a circuit for implementing security protection for cryptographic applications in accordance with the invention.

Figure 3:
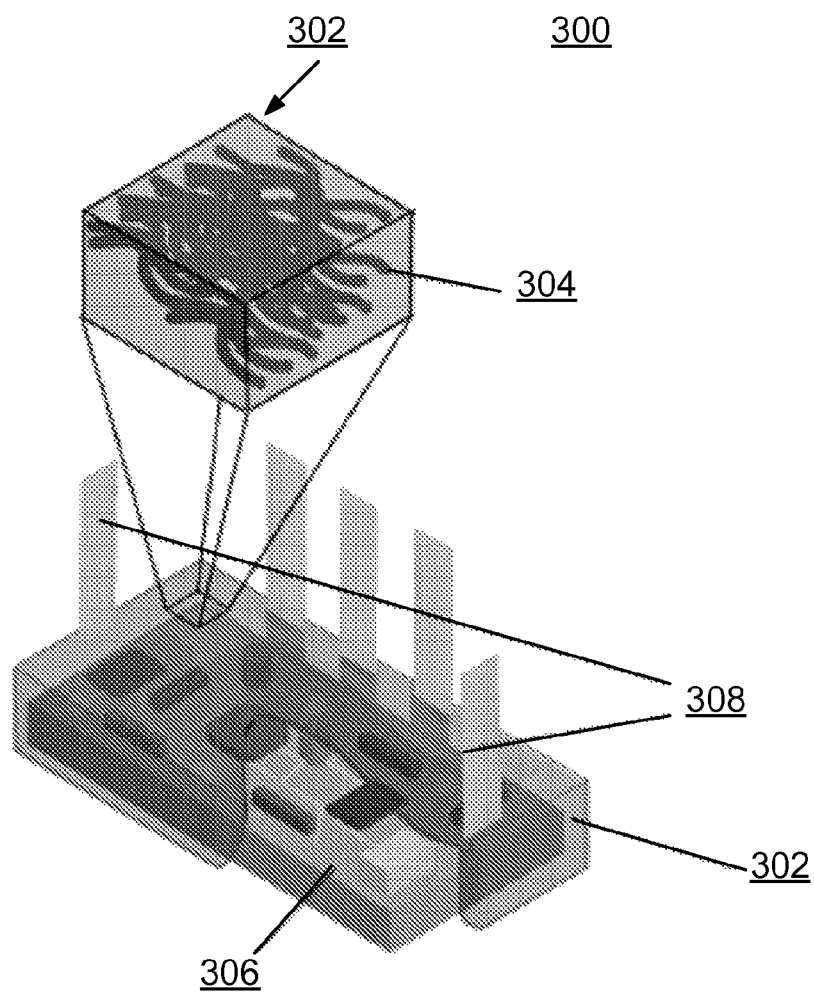
FIG. 3 schematically illustrates an example circuit of FIGS. 1 and 2 implementing sensors and security protection for cryptographic applications in accordance with the preferred embodiment.

Referring to FIG. 3, there is shown an example circuit in accordance with FIGS. 1 and 2 generally designated by the reference character 300 for implementing security protection for cryptographic applications in accordance with the preferred embodiment.

Circuit 300 includes a polymeric resin generally designated by the reference character 302, which can be implemented by generally any polymer. As shown, the polymeric resin 302 contains a carbon nanotube layer 304. The polymeric resin 302 is used to encapsulate a security card generally designated by the reference character 306. Circuit 300 includes a plurality of cables or other suitable electrical connections 308 electrically connecting to the carbon nanotube layer 304 and the security card 306 for monitoring the electrical resistance of the carbon nanotube layer 304 and, various electrical connections, for example, electrically connecting security card 306 to another security card, such as a primary security card (not shown). The security card 306 includes an available power source, such as a battery and/or a capacitor connected to the carbon nanotube layer 304 for operation when the security card 306 otherwise is powered off.

Figure 4A:
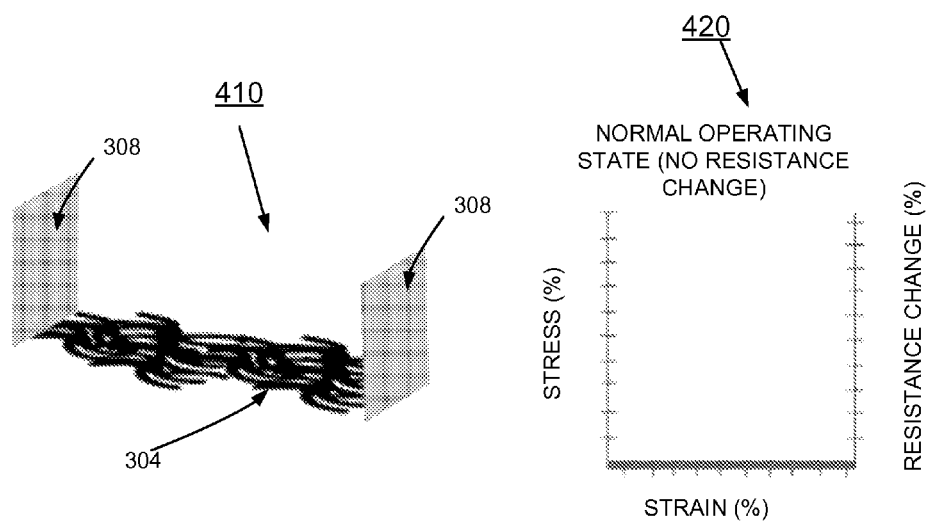
FIGS. 4A and 4B schematically illustrate a respective example carbon nanotube sensor and sensor operation for implementing security protection for cryptographic applications in accordance with the preferred embodiment.
Figure 4B:
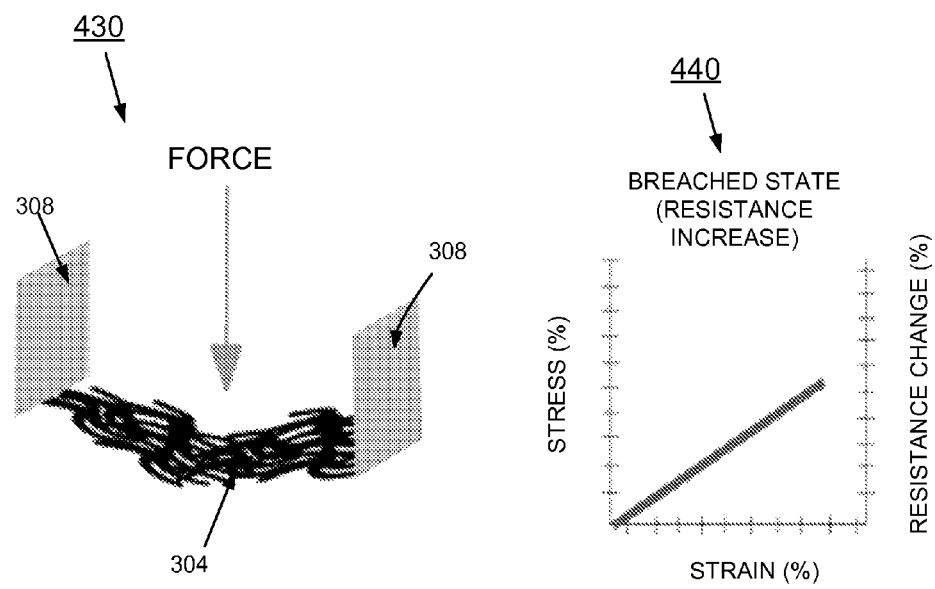

An operational state of the carbon nanotube layer 304 is identified by monitoring the electrical resistance of the carbon nanotube layer 304, for example, as illustrated and described with respect to FIGS. 4A and 4B.

Referring to FIGS. 4A, and 4B, there are shown a respective example carbon nanotube sensor and sensor operation respectively generally designated by the reference characters 410, 420 in FIG. 4A, and respectively generally designated by the reference characters 430, 440 in FIG. 4B for implementing security protection in accordance with the preferred embodiment.

As shown in FIG. 4A, the carbon nanotube sensor 304 is shown in a normal operation state 410 and the sensor operation chart 420 includes a zero strain level (%) shown with the horizontal axis, and a zero stress level (%) and a resistance change level (%) shown with respect to a respective vertical axis.

As shown in FIG. 4B, the carbon nanotube sensor 304 is shown in a breached operation state 430 indicated by an arrow labeled FORCE, and the sensor operation chart 440 illustrates an increasing strain level (%) shown with the horizontal axis, and an increasing stress level (%) and an increasing resistance change level (%) shown with respect to a respective vertical axis.

Figure 5:
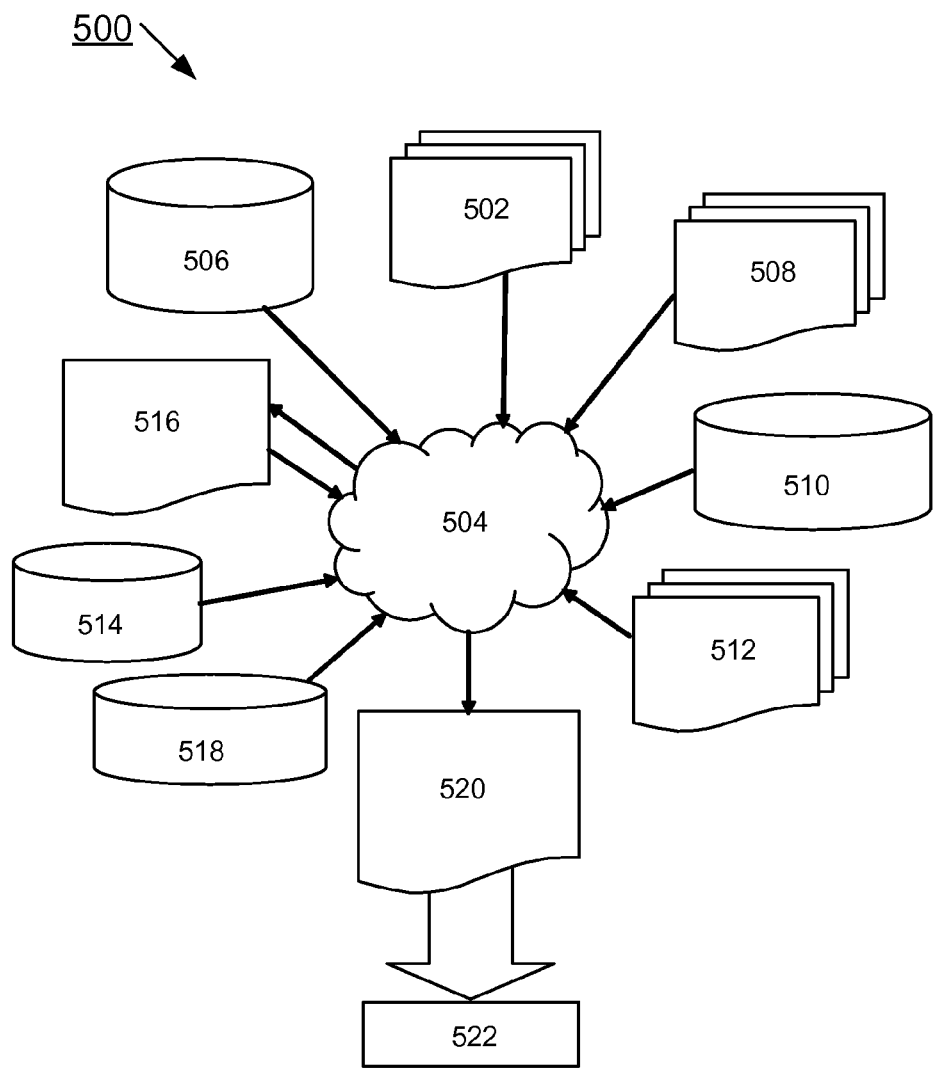
FIG. 5 is a flow diagram of a design process used in semiconductor design, manufacturing, and/or test.

FIG. 5 is a flow diagram of a design process used in semiconductor design, manufacturing, and/or test. FIG. 5 shows a block diagram of an example design flow 500. Design flow 500 may vary depending on the type of IC being designed. For example, a design flow 500 for building an application specific IC (ASIC) may differ from a design flow 500 for designing a standard component. Design structure 502 is preferably an input to a design process 504 and may come from an IP provider, a core developer, or other design company or may be generated by the operator of the design flow, or from other sources. Design structure 502 comprises circuit 300 in the form of schematics or HDL, a hardware-description language, for example, Verilog, VHDL, C, and the like. Design structure 502 may be contained on one or more machine readable medium. For example, design structure 502 may be a text file or a graphical representation of circuit 300. Design process 504 preferably synthesizes, or translates, circuit 100 into a netlist 506, where netlist 506 is, for example, a list of wires, transistors, logic gates, control circuits, I/O, models, etc. that describes the connections to other elements and circuits in an integrated circuit design and recorded on at least one of machine readable medium. This may be an iterative process in which netlist 506 is resynthesized one or more times depending on design specifications and parameters for the circuit.

Design process 504 may include using a variety of inputs; for example, inputs from library elements 504 which may house a set of commonly used elements, circuits, and devices, including models, layouts, and symbolic representations, for a given manufacturing technology, such as different technology nodes, 42 nm, 45 nm, 90 nm, and the like, design specifications 510, characterization data 512, verification data 515, design rules 516, and test data files 518, which may include test patterns and other testing information. Design process 504 may further include, for example, standard circuit design processes such as timing analysis, verification, design rule checking, place and route operations, and the like. One of ordinary skill in the art of integrated circuit design can appreciate the extent of possible electronic design automation tools and applications used in design process 504 without deviating from the scope and spirit of the invention. The design structure of the invention is not limited to any specific design flow.

Design process 504 preferably translates embodiments of the invention as shown in FIGS. 1, 2, 3, 4A and 4B, along with any additional integrated circuit design or data (if applicable), into a second design structure 520. Design structure 520 resides on a storage medium in a data format used for the exchange of layout data of integrated circuits, for example, information stored in a GDSII (GDS2), GL1, OASIS, or any other suitable format for storing such design structures. Design structure 520 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1, 2, 3, 4A and 4B. Design structure 520 may then proceed to a stage 522 where, for example, design structure 520 proceeds to tapeout, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A circuit for implementing security protection with carbon nanotube based sensors comprising:
   a security card;
   a carbon nanotube layer being incorporated with a polymeric resin;
   said security card being encapsulated with said polymeric resin incorporating said carbon nanotube layer;
   electrical connections being provided to said carbon nanotube layer for electrical monitoring of electrical resistance of said carbon nanotube layer.

2. The circuit as recited in claim 1 wherein said carbon nanotube layer is encapsulated with said polymeric resin over said security card without shorting said carbon nanotube layer to said security card.

3. The circuit as recited in claim 1 wherein said carbon nanotube layer is formed by mixing carbon nanotubes in an organic compound and drying the mixture to create said carbon nanotube layer.

4. The circuit as recited in claim 1 wherein said carbon nanotube layer has a known resistance in the unstrained state, and when strained from compression or tension a resistance change of said carbon nanotube layer results.

5. The circuit as recited in claim 1 wherein said carbon nanotube layer has a known resistance in the unstrained state and a resistance change of said carbon nanotube layer results from a temperature change.

6. The circuit as recited in claim 1 wherein said carbon nanotube layer has a known resistance in the unstrained state, and a resistance change for said carbon nanotube layer is identified to activate a security protection function for security card.

7. The circuit as recited in claim 1 wherein a resistance change for said carbon nanotube layer results based upon at lease one of compression, tension, electrical shorts, and temperature change of said carbon nanotube layer.

8. A design structure embodied in a non-transitory machine readable medium used in a design process, the design structure comprising:
   a sequence of computer-executable steps recorded on the non-transitory machine readable medium and capable of implementing said design process and producing a circuit for implementing security protection comprising:
   providing a security card;
   incorporating a carbon nanotube layer with a polymeric resin;
   encapsulating said security card with said polymeric resin incorporating said carbon nanotube layer;
   providing electrical connections to said carbon nanotube layer for electrical monitoring of electrical resistance of said carbon nanotube layer, wherein the design structure, when used in the manufacture of a semiconductor chip produces a chip comprising said circuit.

9. The design structure of claim 8, wherein the design structure comprises a netlist, which describes said circuit.

10. The design structure of claim 8, wherein the design structure resides on said non-transitory machine readable medium as a data format used for the exchange of layout data of integrated circuits.

11. The design structure of claim 8 wherein the design structure includes at least one of test data files, characterization data, verification data, or design specifications.

12. The design structure of claim 8, wherein said carbon nanotube layer has a known resistance in the unstrained state, and when strained from an applied force a resistance change of the carbon nanotube layer results.

13. The design structure of claim 8, wherein said carbon nanotube layer has a known resistance in the unstrained state, and a resistance change of said carbon nanotube layer results based upon at least one of compression, tension, electrical shorts, and temperature change of said carbon nanotube layer.

14. A method for implementing security protection with carbon nanotube based sensors comprising:
   providing a security card;
   incorporating a carbon nanotube layer with a polymeric resin;
   encapsulating said security card with said polymeric resin incorporating said carbon nanotube layer; and
   providing electrical connections to said carbon nanotube layer for electrical monitoring of electrical resistance of said carbon nanotube layer.

15. The method as recited in claim 14 wherein encapsulating said security card with said polymeric resin incorporating said carbon nanotube layer includes encapsulating said polymeric resin over said security card without shorting said carbon nanotube layer to said security card.

16. The method as recited in claim 14 includes forming said carbon nanotube layer by mixing carbon nanotubes in an organic compound and drying the mixture to create said carbon nanotube layer.

17. The method as recited in claim 14 wherein providing electrical connections to said carbon nanotube layer for electrical monitoring of electrical resistance of said carbon nanotube layer includes identifying a resistance change of said carbon nanotube layer based upon at least one of compression, tension, electrical shorts, and temperature change of said carbon nanotube layer.

18. The method as recited in claim 14 includes using said carbon nanotube layer to strengthen said polymer resin.

19. The method as recited in claim 14 wherein providing electrical connections to said carbon nanotube layer for electrical monitoring of electrical resistance of said carbon nanotube layer includes identifying a resistance change of said carbon nanotube layer resulting from a temperature change of said carbon nanotube layer.

20. The method as recited in claim 14 wherein providing electrical connections to said carbon nanotube layer for electrical monitoring of electrical resistance of said carbon nanotube layer includes identifying a resistance change of said carbon nanotube layer resulting from an applied force coupled to said carbon nanotube layer.

* * * * *